(12) United States Patent
Hong et al.

(10) Patent No.: US 12,108,482 B2
(45) Date of Patent: *Oct. 1, 2024

(54) METHOD FOR PROCESSING DATA ON BASIS OF NETWORK SLICE, AND APPARATUS THEREFOR

(71) Applicant: KT CORPORATION, Gyeonggi-do (KR)

(72) Inventors: Sung-Pyo Hong, Seoul (KR); Woo-Jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,204

(22) Filed: Apr. 10, 2023

(65) Prior Publication Data

US 2023/0247716 A1    Aug. 3, 2023

Related U.S. Application Data

(63) Continuation of application No. 17/314,064, filed on May 7, 2021, now Pat. No. 11,627,631, which is a
(Continued)

(30) Foreign Application Priority Data

Nov. 3, 2016    (KR) .................. 10-2016-0146054
Oct. 30, 2017   (KR) .................. 10-2017-0142205

(51) Int. Cl.
*H04W 76/27* (2018.01)
*H04L 41/0806* (2022.01)
(Continued)

(52) U.S. Cl.
CPC ......... *H04W 76/27* (2018.02); *H04L 41/0806* (2013.01); *H04W 36/0072* (2013.01);
(Continued)

(58) Field of Classification Search
CPC ............... H04W 76/27; H04W 72/542; H04W 36/0072; H04W 36/08; H04W 4/70; H04L 41/0806
See application file for complete search history.

(56) References Cited

U.S. PATENT DOCUMENTS 9,681,355 B2    6/2017  Cho
10,616,820 B2   4/2020  Youn et al.
(Continued)

FOREIGN PATENT DOCUMENTS

CN    101803234    8/2010
CN    102711174    10/2012
WO    2016/162480  10/2016

OTHER PUBLICATIONS

Office Action issued on Oct. 21, 2022 for the European Patent Application No. 17867340.6.
(Continued)

*Primary Examiner* — Brenda H Pham
(74) *Attorney, Agent, or Firm* — Insight Law Group, PLLC; Seung Lee

(57) ABSTRACT

Provided are a method of a base station for controlling transmission and reception of data through a network slice. The method includes: receiving network slice request information from a terminal in which a network slice is configured; controlling so as to deliver the network slice request information to a core network entity; and receiving, from the core network entity, specific network slice information configured on the basis of the network slice request information.

16 Claims, 6 Drawing Sheets

Related U.S. Application Data continuation of application No. 16/346,987, filed as application No. PCT/KR2017/012319 on Nov. 2, 2017, now Pat. No. 11,044,777.

(51) Int. Cl.
    *H04W 36/00*      (2009.01)
    *H04W 36/08*      (2009.01)
    *H04W 72/542*      (2023.01)
    *H04W 4/70*      (2018.01)

(52) U.S. Cl.
    CPC ......... *H04W 36/08* (2013.01); *H04W 72/542* (2023.01); *H04W 4/70* (2018.02)

(56) References Cited

U.S. PATENT DOCUMENTS

| | | | |
|---|---|---|---|
| 10,893,455 B2 | 1/2021 | Zee et al. | |
| 10,952,275 B2 | 3/2021 | Zhang et al. | |
| 10,966,222 B2 | 3/2021 | Han et al. | |
| 11,044,777 B2* | 6/2021 | Hong | H04W 36/0072 |
| 11,076,434 B2 | 7/2021 | Sivavakeesar | |
| 11,240,724 B2 | 2/2022 | Han et al. | |
| 11,356,854 B2 | 6/2022 | Futaki et al. | |
| 11,627,631 B2* | 4/2023 | Hong | H04L 41/0806 370/254 |
| 11,765,635 B2 | 9/2023 | Futaki et al. | |
| 2007/0293254 A1 | 12/2007 | Jiang | |
| 2009/0252070 A1 | 10/2009 | Connors et al. | |
| 2011/0274087 A1 | 11/2011 | Liang et al. | |
| 2013/0051315 A1 | 2/2013 | Arzelier et al. | |
| 2014/0086177 A1 | 3/2014 | Adjakple et al. | |
| 2014/0135007 A1 | 5/2014 | Yu et al. | |
| 2014/0198768 A1 | 7/2014 | Hahn et al. | |
| 2014/0199982 A1 | 7/2014 | Hahn et al. | |
| 2015/0256861 A1 | 9/2015 | Oyman | |
| 2016/0353465 A1 | 12/2016 | Vrzic | |
| 2017/0367036 A1 | 12/2017 | Chen | |
| 2018/0007552 A1 | 1/2018 | Bae | |
| 2018/0124854 A1 | 5/2018 | Myhre | |
| 2018/0139660 A1 | 5/2018 | Rommer et al. | |
| 2019/0349803 A1 | 11/2019 | Byun et al. | |
| 2020/0305054 A1 | 9/2020 | Zee et al. | |

OTHER PUBLICATIONS

Huawei, "Support of Network Slice Discovery", R3-162462, 3GPP TSG-RAN WG3 Meeting #93bis, Sophia Antipolis, France, Oct. 2016.
Huawei, "Solution for Selection of Network Slice and CN entity", R3-162594, 3GPP TSG-RAN WG3 Meeting #93bis, Sophia Antipolis, France, Oct. 10-14, 2016.
Huawei et al., "RRC support for network slicing", R2-163595, 3GPP TSG-RAN WG2 Meeting #94, Nanjing, China, May 23-27, 2016.
European Patent Office, European Search Report of corresponding EP Patent Application No. 17867340.6, May 12, 2020.
3GPP, "3rd Generation Partnership Project; Technical Specification Group Services and System Aspects; Study on Architecture for Next Generation System (Release 14)", 3GPP TR 23.799 V1 .0.0, Sep. 2016.
Ericsson, "Solution for selection of a network slice instance", S2-161480, SA WG2 Meeting #114, Apr. 11-15, 2016, Sophia Antipolis, pp. 1-4.
Qualcomm Incorporated, "Solution for key issue 1 on Network Slicing: Network Slice and Network Functions Selection based on evolved eDECOR model", S2-162339, SA WG2 Meeting #115, May 23-27, 2016, Nanjing, P.R. China, pp. 1-7.
Samsung, "Solution for Network Slice Selection based on the NG UE's service context", S2-162622, SA WG2 Meeting #115, May 23-27, 2016, Nanjing, P.R. China, pp. 1-4.
A Chinese Office Action issued on Nov. 11, 2021 in connection with Chinese Patent Application No. 201780068268.0.
Complaint for Patent Infringement, submitted on Dec. 29, 2023 for 2:23-cv-0063—*Pegasus Wireless Innovation LLC* v. *AT&T Inc et al.* in the United States District Court for the Eastern District of Texas Marshall Division.
Complaint for Patent Infringement, submitted on Dec. 29, 2023 for 2:23-cv-00639—*Pegasus Wireless Innovation LLC* v. *T-Mobile, US, Inc et al.* in the United States District Court for the Eastern District of Texas Marshall Division.
Complaint for Patent Infringement, submitted on Dec. 29, 2023 for 2:23-cv-00640—*Pegasus Wireless Innovation LLC* v. *Verizon Communications Inc et al.* in the United States District Court for the Eastern District of Texas Marshall Division.
Nec et al.: "Updated interim agreements on session management", 3GPP Draft; S2-166281_6109_5718_NG_SM NTERIMAGR-V02, SA WG2 Meeting #117, Oct. 17-21, 2016, Kaohsiung City, Taiwan.
Extended European Search Report mailed on Nov. 9, 2023 from the European Patent Office for European Application No. 23192739.3.
Anonymous: "EMM Procedure 6. Handover without TAU—Part 2. X2 Handover | NETMANIAS", Mar. 21, 2014 (Mar. 21, 2014), pp. 1-7, XP093096603.
Huawei: "Support of Network Slice Discovery", 3rd Generation Partnership Project (3GPP), TSG-RAN WG3 Meeting #93bis Sophia Antipolis, France, Oct. 10-14, 2016, XP051152110, R3-162462.
Huawei: "Solution for Selection of Network Slice and CN entity", 3RD Generation Partnership Project (3GPP), TSG-RAN WG3 Meeting #93bis Sophia Antipolis, France, Oct. 10-14, 2016, XP051152239, R3-162594.
R3-173152 "Xn based mobility across RA" ("R3-173152") 3GPP TSG-RAN WG3 Meeting #97, Berlin, Germany, Aug. 21-25, 2017.
3GPP TR 38.801 V0.4.0 (Aug. 2016) ("TR 38.801 V0.4.0"). 3rd Generation Partnership Project; Technical Specification Group Radio Access Network; Study on New Radio Access Technology; Radio Access Architecture and Interfaces (Release 14).
R3-171116 "Connected Mode Mobility with Slicing" ("R3-171116"). 3GPP TSG-RAN WG3#95bis, Spokane, USA, Apr. 3-7, 2017.
R3-171029 "NW Slice Availability Handling Approaches During Mobility" ("R3-171029"). 3GPP TSG RAN WG3 Meeting #95bis, Spokane, USA, Apr. 3-7, 2017.
R3-170065 "Selection RAN Part Network Slice During UE Mobility" ("R3-170065"). 3GPP TSG RAN WG3 NR-adhoc, Spokane, USA, Jan. 17-19, 2017.
R3-173614 "Discussion on Slice Mobility Issue" ("R3-173614"). 3GPP TSG-RAN WG3 #97bis, Prague, Czech Republic, Oct. 9-13, 2017.
Appendix A: Invalidity of U.S. Pat. No. 11,627,631 ("631 Patent") Obviousness Combinations, delivered on May 17, 2024 for 2:23-cv-00638, 39 and 40.
Exhibit A-1: Invalidity Analysis of U.S. Pat. No. 11,627,631 ("'631 Patent") in view of Xn Based Mobility Across Ra ("R3-173152"), delivered on May 17, 2024 for 2:23-cv-00638, 39 and 40.
Exhibit A-2: Invalidity Analysis of U.S. Pat. No. 11,627,631 ("'631 Patent") in view of U.S. Pat. No. 10,966,222 to Han et al. ("Han 222"), delivered on May 17, 2024 for 2:23-cv-00638, 39 and 40.
Exhibit A-3: Invalidity Analysis of U.S. Pat. No. 11,627,631 ("'631 Patent") in view of U.S. Pat. No. 11,765,635 to Futaki et al. ("Futaki 635"), delivered on May 17, 2024 for 2:23-cv-00638, 39 and 40.
Exhibit A-4: Invalidity Analysis of U.S. Pat. No. 11,627,631 ("'631 Patent") in view of 3GPP TR 38.801 V0.4.0 (Aug. 2016) 3rd Generation Partnership Project; Technical Specification Group Radio Access Network; Study on New Radio Access Technology; Radio Access Architecture and Interfaces (Release 14) ("TR 38.801 V0.4.0"), delivered on May 17, 2024 for 2:23-cv-00638, 39 and 40.
Exhibit A-5: Invalidity Analysis of U.S. Pat. No. 11,627,631 ("'631 Patent") in view of U.S. Pat. No. 11,356,854 to Futaki et al. ("Futaki 854"), delivered on May 17, 2024 for 2:23-cv-00638, 39 and 40.
Exhibit A-6: Invalidity Analysis of U.S. Pat. No. 11,627,631 ("'631 Patent") in view of U.S. Pat. No. 10,893,455 to Zee et al. ("Zee"), delivered on May 17, 2024 for 2:23-cv-00638, 39 and 40.

(56) References Cited

OTHER PUBLICATIONS

Exhibit A-7: Invalidity Analysis of U.S. Pat. No. 11,627,631 ("'631 Patent") in view of U.S. Pat. No. 11,240,724 to Han et al. ("Han 724"), delivered on May 17, 2024 for 2:23-cv-00638, 39 and 40.
Exhibit A-9: Invalidity Analysis of U.S. Pat. No. 11,627,631 ("'631 Patent") in view of U.S. Pat. Pub. No. 2011/0274087 to Liang et al. ("Liang"), delivered on May 17, 2024 for 2:23-cv-00638, 39 and 40.
Exhibit A-9: Invalidity Analysis of U.S. Pat. No. 11,627,631 ("'631 Patent") in view of U.S. Pat. Pub. No. 2019/0349803 to Byun et al. ("Byun"), delivered on May 17, 2024 for 2:23-cv-00638, 39 and 40.
Exhibit A-10: Invalidity Analysis of U.S. Pat. No. 11,627,631 ("'631 Patent") in view of U.S. Pat. Pub. No. 2014/0135007 to Yu et al. ("Yu"), delivered on May 17, 2024 for 2:23-cv-00638, 39 and 40.
Exhibit A-11: Invalidity Analysis of U.S. Pat. No. 11,627,631 ("'631 Patent") in view of Connected Mode Mobility with Slicing ("R3-171116"), delivered on May 17, 2024 for 2:23-cv-00638, 39 and 40.
Exhibit A-12: Invalidity Analysis of U.S. Pat. No. 11,627,631 ("'631 Patent") in view of NW Slice Availability Handling Approaches During Mobility ("R3-171029"), delivered on May 17, 2024 for 2:23-cv-00638, 39 and 40.
Exhibit A-13: Invalidity Analysis of U.S. Pat. No. 11,627,631 ("'631 Patent") in view of Selection RAN Part Network Slice During UE Mobility ("R3-170065"), delivered on May 17, 2024 for 2:23-cv-00638, 39 and 40.
Exhibit A-14: Invalidity Analysis of U.S. Pat. No. 11,627,631 ("'631 Patent") in view of Discussion on Slice Mobility Issue ("R3-173614"), delivered on May 17, 2024 for 2:23-cv-00638, 39 and 40.

* cited by examiner

METHOD FOR PROCESSING DATA ON BASIS OF NETWORK SLICE, AND APPARATUS THEREFOR

CROSS-REFERENCE TO RELATED APPLICATION

This is a continuation application of U.S. patent application Ser. No. 17/314,064, filed May 7, 2023, the disclosure of which is incorporated herein by reference in its entirety. U.S. patent application Ser. No. 17/314,064 is a continuation application of U.S. patent application Ser. No. 16/346,987, filed May 2, 2019, now U.S. Pat. No. 11,044,777, issued Jun. 22, 2021, the disclosure of which is incorporated herein by reference in its entirety. U.S. patent application Ser. No. 16/346,987 is a National Stage Entry of International Patent Application No. PCT/KR2017/012319, filed Nov. 2, 2017, the disclosure of which is incorporated herein by reference in its entirety. The International Patent Application No. PCT/KR2017/012319 claims the priority to and benefits of Korean Patent Application Nos. 10-2016-0146054 filed Nov. 3, 2016 and 10-2017-0142205 filed on Oct. 30, 2017, which are hereby incorporated by reference in their entirety into this application.

TECHNICAL FIELD

The present disclosure relates to a technology for network slicing in a next generation mobile communication network, and, in particular, to a technology for providing services using network slicing to moving user equipments without interruption.

BACKGROUND ART

Due to advances in communication systems, various types of wireless terminals have been introduced to consumers such as companies and individuals.

Mobile communication systems employing technologies related to 3rd generation partnership project (3GPP), such as Long Term Evolution (LTE), LTE-Advanced, fifth generation (5G), or the like, have been designed for transmitting and receiving a large amount of various data, such as video data, radio data, or the like, at a high-speed.

Meanwhile, after LTE-Advanced, technologies for next generation radio access networks have been developed for enabling a user equipment to transmit and receive even more data at higher speed and providing higher quality of service (QoS). For example, many development groups related to 3GPP have been introducing various 5G network technologies.

In particular, there are many researches and studies in progress for developing a service-oriented next generation mobile communication network employing network slicing technology in order to improve the efficiency of utilizing network resources, effectively accommodate a mobile service with various requirements, and guarantee quality of an end-to-end service to even user equipments However, there is no discussion conducted for mobility guarantee of the user equipment and transmission/reception procedures of data in case the network slicing technology is employed. It is necessary to develop a specific procedure for service continuity and service stability.

DETAILED DESCRIPTION OF THE INVENTION

Technical Problem

Accordingly, to address such issues, the present disclosure is directed to a procedure of a user equipment and a base station for providing services based on network slicing, and a procedure for controlling the mobility of the user equipment using services based on the network slicing. Additional features and advantages of the disclosure will be set forth in the description which follows and in part will be apparent from the description, or may be learned by practice of the disclosure. The objectives and other advantages of the disclosure will be realized and attained by the structure particularly pointed out in the written description and claims hereof as well as the appended drawings.

Technical Solution

In accordance with an aspect of the present disclosure, a method of a base station is provided for controlling data transmission and reception through network slicing. The method includes: receiving network slice request information from a user equipment configured with the network slice, controlling the network slice request information to be transferred to a core network entity, and receiving specific network slice information that is configured based on the network slice request information from the core network entity.

In accordance with another aspect of the present disclosure, a method of a user equipment is provided for controlling data transmission and reception through a network slice. The method includes: configuring a network slice, transmitting network slice request information to a base station, and receiving, from the base station, a handover command generated based on specific network slice information received from a core network entity by a target base station.

In accordance with further another aspect of the present disclosure, a base station is provided for controlling data transmission and reception through a network slice. The base station includes: a receiver receiving network slice request information from a user equipment configured with the network slice, and a controller controlling the network slice request information to be transferred to a core network entity. The receiver further receives specific network slice information that is configured based on the network slice request information from the core network entity.

In accordance with yet another aspect of the present disclosure, a user equipment is provided for controlling data transmission and reception through a network slice. The user equipment includes: a controller configuring a network slice, a transmitter transmitting network slice request information to a base station, and a receiver receiving, from the base station, a handover command generated based on specific network slice information received from a core network entity by a target base station.

Effects of the Invention

In accordance with embodiments of the present disclosure, services may be provided through network slicing with service interruption reduced or prevented.

In accordance with embodiments of the present disclosure, a user equipment and a base station may provide services through network slicing, resulting in the user equipment processing a large amount of data at an even higher speed.

BEST MODE FOR CARRYING OUT THE INVENTION

Figure 1:
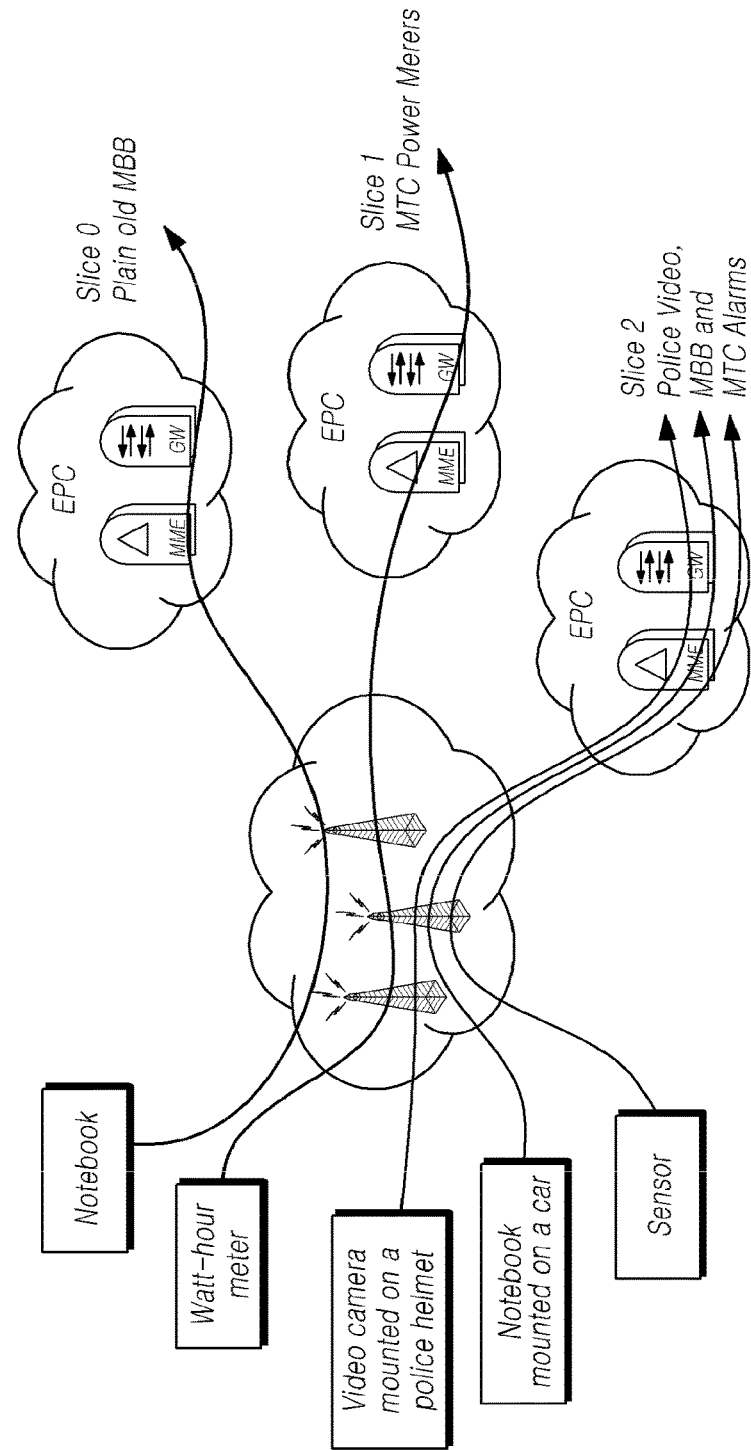
FIG. 1 is a diagram illustrating a plurality of slices in a network infrastructure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a machine type communication (MTC) terminal may refer to a terminal supporting low cost (or low complexity), a terminal supporting coverage enhancement, or the like. The MTC terminal may refer to a terminal supporting low cost (or low complexity), a terminal supporting coverage enhancement, and the like. The MTC terminal may refer to a terminal classified into a predetermined category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13.

In the present disclosure, a wireless communication system is widely deployed to provide various communication services, such as a voice communication service, a packet data service, etc. The wireless communication system includes a user equipment (Hereinafter, referred to as "UE") and a base station (BS, or eNB). In the present disclosure, the UE is defined as a generic term referring to terminals used in wireless communications. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, the base station or the cell is defined as a generic term including, but not limited to, as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms a corresponding communication service area, such as a megacell, a macrocell, a microcell, a picocell, a femtocell, or a small cell, and provides a communication service within the corresponding communication service area or 2) a communication service area itself. In the case of 1), the base station may be referred to i) apparatuses that are controlled by the same entity for forming a corresponding communication service area and providing a communication service within the corresponding communication service area or ii) apparatuses that interact and cooperate with each other for forming the corresponding communication service area and providing a communication service within the corresponding communication service area. According to communication schemes employed by a base station, the base station may be referred to as an eNB, a RRH, an antenna, a RU, a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. An embodiment of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, under the related standard, in some systems such as the LTE system or the LTE-advanced system, the UL and the DL are configured based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a base station or macrocell (hereinafter, referred to as 'eNB') and at least one remote radio head (RRH) that is connected to the eNB through an optical cable or an optical fiber and thereby controlled in a wired manner, and that has high transmission power or low transmission power in the macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission/reception of a signal through a channel such as the PUCCH, the PUSCH, the PDCCH, or the PDSCH, may be described as transmission/reception of the channel, such as the PUCCH, the PUSCH, the PDCCH, or the PDSCH.

In addition, hereinafter, a description of transmitting or receiving a PDCCH or a description of transmitting or receiving a signal through the PDCCH may be used as meaning including transmitting or receiving an EPDCCH or transmitting or receiving a signal through the EPDCCH.

That is, a physical DL control channel described below may mean the PDCCH or the EPDCCH, or is also used as meaning including both the PDCCH and the EPDCCH.

Also, for convenience of description and ease of understanding, an EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below includes radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments of the present disclosure may be applied to resource allocation in i) asynchronous wireless communication evolving into LTE/LTE-advanced and IMT-2020 from GSM, WCDMA, and HSPA, ii) synchronous wireless communication evolving into CDMA, CDMA-2000, and UMB. In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement. In other words, the MTC terminal may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13. The MTC terminal may refer to a further enhanced MTC terminal defined in Release-14.

In the present disclosure, a Narrowband Internet of Things (NB-IoT) terminal refers to a terminal supporting radio access for cellular IoT. NB-IoT technology improves indoor coverage, supports for large-scale low-speed terminals, lowers latency sensitivity, reduces terminal costs, minimizes power consumption, and optimizes network architecture.

An enhanced mobile broadband (eMBB), massive machine-type communication (mMTC), and ultra-reliable and low latency communication (URLLC) are proposed as representative usage scenarios for NR having been discussed in the 3GPP recently. In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

Embodiments described below may be applied to UEs, base stations, and core network entities (e.g., MME, AMF, etc.), using next generation mobile communication (5G mobile communication, New-RAT, NR). For convenience of description, the base station may denote a base station (a central unit (CU), a distributed unit (DU), or an entity in which the CU and the DU are implemented as one logical entity) or a gNB, in a 5G radio network in which the central unit and the distributed unit are separated from each other.

In addition, the central unit and the distributed unit described herein may mean a central unit and a distributed unit included in one base station, respectively, and one or more distributed units may be connected to one central unit. Thus, the distributed unit described below may mean a specific distributed unit of a set of one or more distributed units. In addition, a service described herein may mean the overall of a network service configured by utilizing resources of a network in which a user equipment is connected to the network through a base station. Such a service may be provided through an end-to-end network slice described below.

Typical mobile communication networks, such as 4G mobile communication network (e.g., LTE), include a core network and an access network linked through physical network entities. As a result, the efficiency of utilizing network resources reduces, and it is not easy to change configurations of the communication network. Recently, discussions have been conducted on a service-oriented next generation mobile communication network employing a network slicing technology for effectively accommodating a mobile service with various requirements, and guaranteeing quality of an end-to-end service to even UEs.

The network slicing is a technology for improving flexibility by dividing a network into multiple types of virtual networks using network virtualization technologies and configuring a separate logical network for each service or subscriber. With network slicing, a needed resource may be allocated from a virtualized network resource pool according to a service type. Therefore, when a new service is introduced, it is possible to provide the service rapidly without a physical network established, and to use efficiently limited physical network resources. Thus, the network slicing enables a logical network to be implemented in an infrastructure shared among multiple network slices, compared with establishing an independent network slicing infrastructure.

FIG. 1 is a diagram illustrating a plurality of slices configured in a network infrastructure.

Referring to FIG. 1, a service for connecting a notebook to the Internet through mobile broadband (MBB), a data service of watt-hour meter using machine type communications (MTC), a service for a video camera mounted on a police helmet and a notebook located on a police car, a data service of an MTC sensor, and the like, may be individually and dependently provided through a plurality of slices configured in a network infrastructure. Thus, network resource utilization, etc. may be improved by slicing and providing the network resource for each individual service.

The network slicing allows differentiated treatment depending on each customer requirements. With slicing, it is now possible for mobile network operators (MNO) to consider customers as belonging to different tenant types with each having different service requirements that govern in terms of what slice types each tenant is eligible to use based on service level agreement (SLA) and subscriptions.

A specific procedure is needed for a UE to transmit and receive data through a specific network slice or one or more network slices provided over a shared infrastructure. However, such a specific procedure has not been proposed or developed yet. In particular, the mobility of the UE is essentially required in mobile communication. It is necessary to develop a specific method for transmitting and receiving data without service interruption through the specific network slice or one or more network slices. However, such a specific method has not been provided yet. Accordingly, it is impossible to guarantee the service continuity when a cell change is required as the UE moves.

To address such issues, in accordance with embodiments of the present disclosure, a method and apparatus are provided for transmitting and receiving data based on network slicing in a mobile communication network. In addition, a method and apparatus are provided for minimizing service interruption while a UE moves between cells, and transmitting and receiving data based on network slicing.

Hereinafter, specific methods according to embodiments of the present disclosure are discussed in detail. Methods described below may be used individually or in any combination with methods.

A cell in the LTE is defined as "combination of DL and optionally UL resources" Synchronization of the cell in the LTE depends on PSS/SSS and allows the UE to acquire the encoded PCI and the frame timing for reception of all DL transmissions and for all UL transmissions (in addition to the UL timing advance, for UL transmissions). In this sense, all DL transmissions which are time aligned with PSS/SSS and all UL transmissions using the PSS/SSS as timing reference belong to a cell. In order to suppress interference from neighbor cells, all DL transmissions are scrambled with (for physical channels) or determined by (for reference signals) a specific sequence. For most DL transmissions, the corresponding sequence is associated to the PCI, which value is determined from the sequence visible from PSS/SSS. Using different PCI values for neighbor cells allows different DL transmissions to use different sequences. After synchronization to the network, the UE acquires the cell reference symbols (CRS) which allows decoding the PBCH carrying the MIB. According to the MIB, the UE knows the cell bandwidth, PHICH and SFN. After acquiring the MIB and the PCFICH, the UE knows exactly the location of control channel, i.e., PDCCH and can acquire system information.

From L3 perspective, system information is a set of parameters associated to each other as part of "a cell". All these signals and channels are using a sequence determined by the value of the PCI, which is the same for all, Data transmission in LTE is controlled by information transmitted on PDCCH. The UE is allocated at least a C-RNTI, which is implicitly encoded in control indications (either DL, DCI, or UL, UCI) via a CRC calculation. As for data, they are scrambled using a sequence determined by the PCI but also by the UE RNTI also providing some randomization of transmissions across multiple UEs, which can be useful e.g. in case of spatial multiplexing. When the UE is in RRC_CONNECTED, the UE is configured with DL measurement gap and measurement events in order to prepare handover as the UE is moving. The measurement process includes synchronization and reading of CRS and PCI is used to identify different cells.

It is also necessary define a cell in a new radio technology network (or a 5G network, hereinafter, for convenience of description, referred to as NR). For example, one NR cell in the NR may be associated with one or more of procedures described below.

DL synchronization signals deriving identical NR cell ID;
identical system information distribution for at least minimum SI;
efficient use of all possible types of multi-TRP operation;
DL/UL physical channels/signals towards a connected UE are identical/valid in more than one TRP.

An NR cell may have one or more of a single set of system information, barring and same tracking area. In the case that a single NR cell consists of more than one TRP, then all the TRPs transmit the same system information.

The NR cell may be flexibly associated with slice information. For example, an NR cell may support a dedicated slice information or multiple different slice information. One NR cell may support slice information different from those of neighbor NR cells. Here, the slice information may represent a slice type, a tenant type, a slice identity (ID), a tenant ID, multi-dimensional descriptor (MDD) information, a slice service, slice service information, slice configuration information, slice characteristic information, an RAN function (any NR functions, any E-UTRAN functions) of a corresponding slice, or information for differentiating/identifying/describing an RAN function list of a corresponding slice. For convenience of description, hereinafter, the term "slice information" will be used. This is only for convenience of description, and thus, it should be considered that any information for differentiating/identifying/describing a specific network slice in the NR is included the scope of the present disclosure. For example, information for identifying a network slice may be described as slice information.

The slice information for identifying a network slice may include information on a slice service type and a slice differentiator. The slice differentiator includes information representing a difference between identical slice service types. For example, the eMBB service may be designated as one slice service type. As another example, the URLLC may be designated as one slice service type. As further another example, the IoT service may be designated as one slice service type. As yet another example, a slice differentiator may be designated for supporting a voice service in the eMBB slice service type. As yet another example, a slice differentiator may be designated for supporting an image service in the eMBB slice service type.

For enabling a UE (hereinafter, for convenience of description, referred to as a UE configured with a specific slice) having one specific slice information or one or more specific slice information (or associated with this or configured with this) to access NR cell/network (hereinafter, for convenience of description, referred to as a cell/network configured with a slice) having corresponding slice information, the network configured with the related slices may provide additional information.

For example, an NR cell may provide slice information to a UE. For example, the slice information may be broadcast through system information. As another example, the slice information may be indicated to a UE through RRC dedicated signaling. Through this information, the UE may select an NR cell providing i) a slice configured for the UE, ii) a slice to which the UE belongs, and iii) a slice to which the UE has subscribed.

For another example, an NR cell may provide slice information of a neighbor cell to a UE. For example, the slice information of the neighbor cell may be broadcast through system information. As another example, the slice information of the neighbor cell may be indicated to a UE through RRC dedicated signaling. Through this information, the UE may select or reselect an NR cell providing i) a slice configured for the UE, ii) a slice to which the UE belongs, and iii) a slice to which the UE has subscribed.

Meanwhile, when the UE configured with a specific slice moves between cells (or moves between base stations, moves to another base station cell), technologies for supporting the service continuity may be provided for reducing service interruption. Examples of possible service scenarios are as follows.

Scenario 1: Moving from a Cell Supporting Network Slicing to a Cell not Supporting the Network Slicing While a UE is located in a source cell (or a current cell or a camped cell), the UE may recognize whether a neighbor cell to which the UE is intended to move supports/allows a specific network slice based on on-demand system information associated with network slicing related system information or network slicing related minimum system information of a neighbor cell, or indication information over RRC dedicated signaling (e.g., an RRC release message) for identifying whether the neighbor cell supports the network slicing.

When the neighbor cell does not support/allow the specific network slice, while the UE transmits and receives data through network slicing in the source cell, the UE may request a network slicing service to an application server for supporting the specific network slice through unicast, reselect a cell supporting/allowing the specific network slice, or reselect a cell by generating a cell reselection priority of the cell not supporting/allowing the specific network slice to be a lower priority. To this end, the NR cell may generate the cell reselection priority differently according to whether the neighbor cell supports/allows the specific network slice, and then indicate this to the UE. The UE may perform cell reselection by assigning a priority to a cell supporting/allowing the specific network slice configured for the UE. When one or more network slices are configured for the UE, the UE may perform the cell reselection based on a cell reselection priority of a network slice (e.g., selecting a network slice having a higher priority) according to network slice priority information configured/allowed/indicated by a core network entity.

Scenario 2: A Movement from a Cell not Supporting/Allowing Network Slicing to a Cell Supporting/Allowing the Network Slicing While a UE is located in a source cell (or a current cell or a camped cell), the UE may recognize whether a neighbor cell to which the UE is intended to move supports/allows a specific network slice based on on-demand system information associated with network slicing related system information or network slicing related minimum system information of a neighbor cell, or indication information over RRC dedicated signaling (e.g., an RRC release message) for identifying whether the neighbor cell supports the network slicing. To this end, the NR cell may generate a cell reselection priority differently depending on whether the neighbor cell supports/allows the specific network slice or not, and then inform the UE of the cell reselection priority. Through this, the UE may perform cell reselection based on the cell reselection priority assigned to a cell supporting/allowing the specific network slice.

Hereinafter, a UE and a base station for configuring a network slice and controlling mobility will be described with reference to the accompanying drawings.

Figure 2:
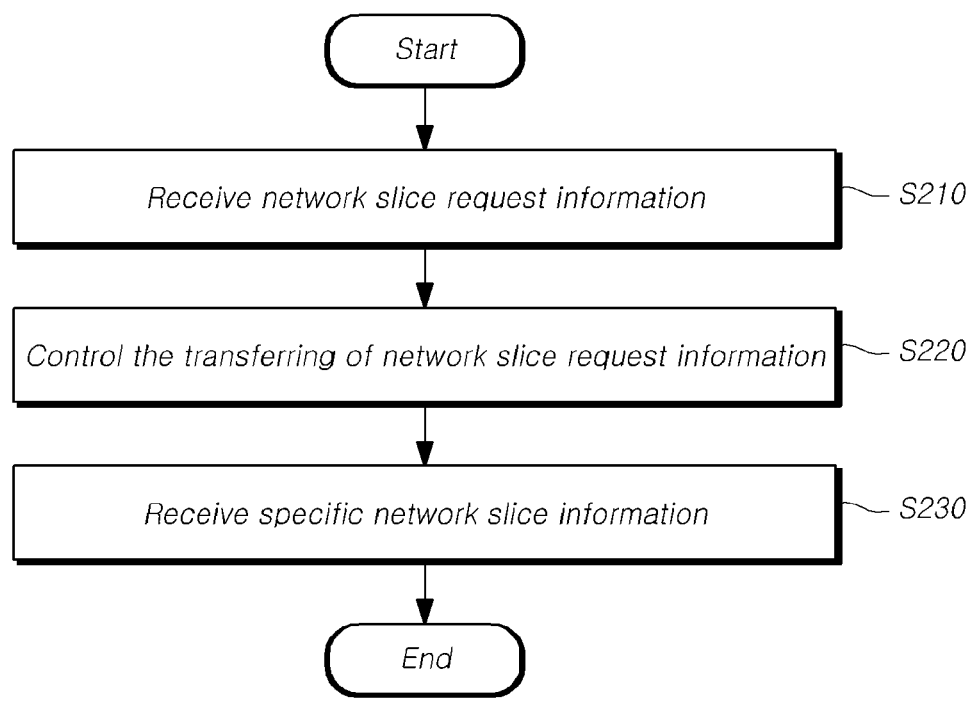
FIG. 2 illustrates a flowchart illustrating operations of a base station according to at least one embodiment of the present disclosure.

FIG. 2 illustrates a flowchart illustrating operations of a base station according to at least one embodiment of the present disclosure.

Referring to FIG. 2, the base station may receive network slice request information from a UE configured with a network slice, at step S210. For example, the UE may be configured with one or more network slices through network slice information received through broadcast system information or an RRC reconfiguration message. Alternatively, the UE may be configured with one or more network slices using pre-configured network slice information. One network slice may be configured to be associated with one protocol data unit (PDU) session.

The base station has received the network slice request information from the UE. The network slice request information may be included in a radio resource control (RRC) connection setup message. Alternatively, the network slice request information may be included in a non-access stratum (NAS) message included in the RRC connection setup message.

In addition, the network slice request information may include specific network slice information configured for the UE. For example, the network slice request information may include information on at least one of network slice configured for the UE, information for identifying a network slice service/PDU session/bearer associated with the corresponding network slice information, and information on a priority of the corresponding network slice. Here, the network slice information associated with the UE means information on a network slice configured for the UE by a network or information on a network slice allowed by the network based on subscription information.

The base station may control the network slice request information to be transferred to a core network entity, at step S220. For example, when the base station receives the network slice request information from the UE, the base station may control the received network slice request information to be transferred to the core network entity. This is for authorization, identification and confirmation/acknowledgment by the UE on network slice information included in the corresponding network slice request information. To this end, the base station transmits the network slice request information to the core network entity.

The base station may receive specific network slice information that is configured based on the network slice request information from the core network entity, at step S230. After the base station has transmitted the network slice request information to the core network entity, the base station may receive the specific network slice information that is configured based on the network slice request information from the core network entity. For example, the specific network slice information is identified by the core network entity based on the network slice request information and the subscription information and may be received by being included in UE context information.

When the core network entity has received the network slice request information, the core network entity may verify whether the UE has a right to access the corresponding network slice. As another example, the core network entity may transmit, to the base station, UE context information including specific configured network slice information according to a value that is included in subscriber information etc. though a subscriber information server. For example, the UE context information transmitted by the core network entity may include network slice related information or configured network slice information. Here, the network slice related information may include at least of information for identifying a service/PDU session/bearer associated with corresponding network slice information and bearer information of a PDU session associated with the network slice.

Through this, the core network entity may control a service through the network slice of the UE, and data transmission and reception through the network slice.

Figure 3:
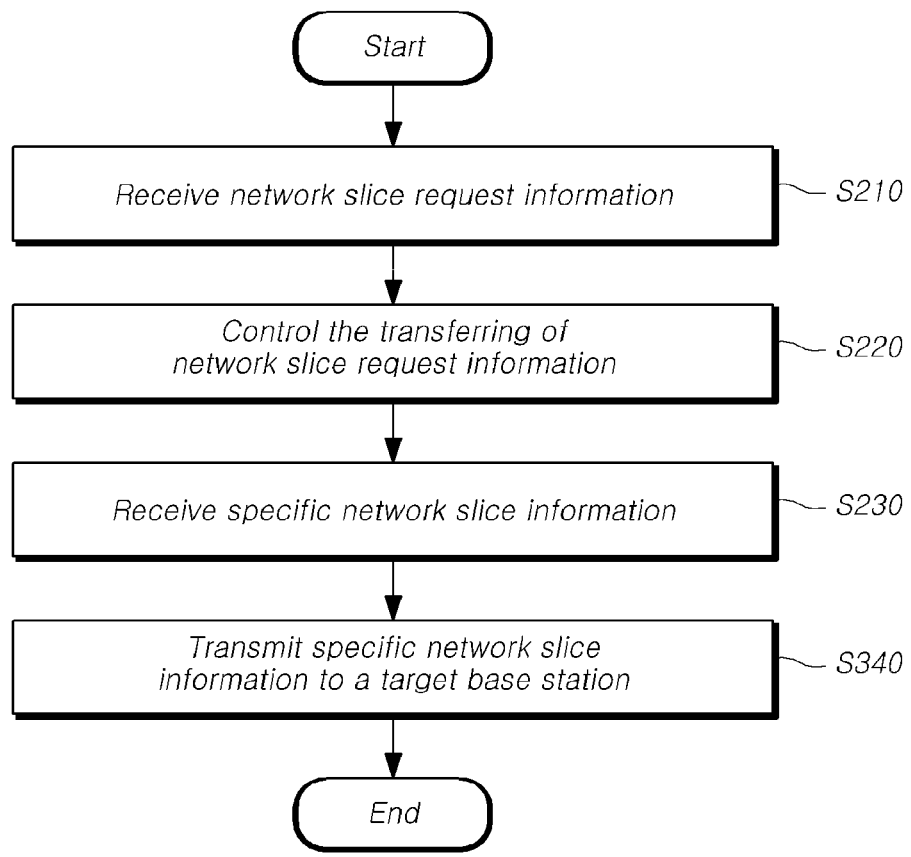
FIG. 3 illustrates a flowchart illustrating operations of a base station according to at least one embodiment of the present disclosure.

FIG. 3 illustrates a flowchart illustrating operations of a base station according to at least one embodiment of the present disclosure.

Referring to FIG. 3, the base station may receive network slice request information from a UE configured with a network slice at step S210, control the network slice request information to be transferred to be a core network entity at step S220, receive specific network slice information that is configured based on the network slice request information from the core network entity at step S230, and transmit the specific network slice information to a target base station at step S340.

Here, the steps S210 to S230 may be performed in identical or similar manner to embodiments described above with reference to FIG. 2.

After the base station has received the specific network slice information from the core network entity, the base station may transmit the specific network slice information to the target base station. For example, the base station may transmit the specific network slice information to the target base station through the core network entity. As another example, the base station may transmit the specific network slice information to the target base station through an interface with the target base station.

When the target base station receives the specific network slice information, the target base station may generate a handover command for the UE based on at least one of the specific network slice information and network slice information allowed by the target base station. The handover command that the target base station has transferred to the base station may be transmitted to the UE by the base station. That is, the UE receives the handover command from the source base station.

Figure 4:
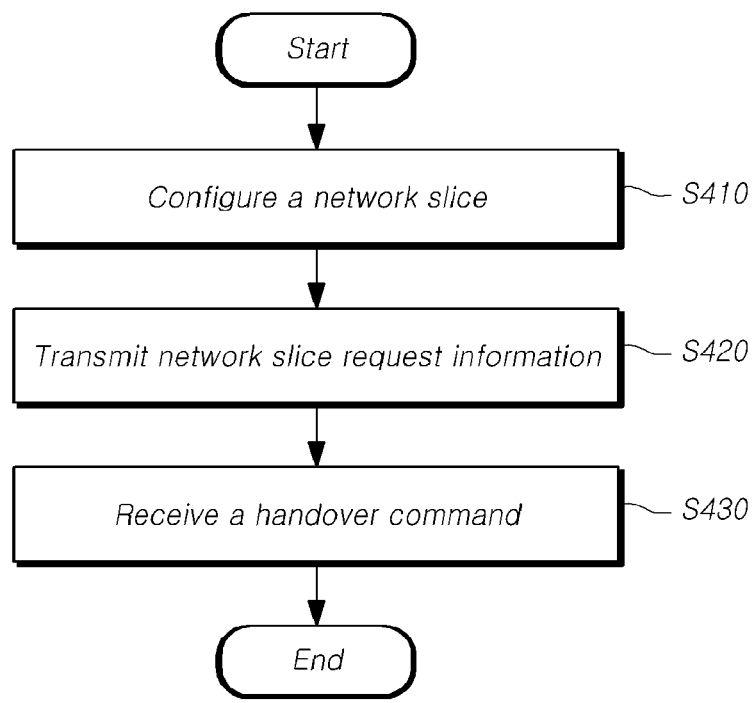
FIG. 4 illustrates a flowchart illustrating operations of a user equipment according to at least one embodiment of the present disclosure.

FIG. 4 illustrates a flowchart illustrating operations of a user equipment according to at least one embodiment of the present disclosure.

Referring to FIG. 4, the UE may configure the network slice at step S410. For example, the UE may be configured with one or more network slices through network slice information received through broadcast system information or an RRC reconfiguration message. Alternatively, the UE may be configured with one or more network slices using pre-configured network slice information. One network slice may be configured to be associated with one protocol data unit (PDU) session. Accordingly, the UE may be configured with one or more network slices.

The UE may transmit the network slice request information to the base station at step S420. The network slice request information may be included in a radio resource control (RRC) connection setup message. Alternatively, the network slice request information may be included in a non-access stratum (NAS) message included in the RRC connection setup message. That is, the UE may transmit the network slice request information through high layer signaling.

The network slice request information may include the specific network slice information configured for the UE. Furthermore, the network slice request information may include information on at least one of network slices configured for the UE, information for identifying a network slice service/PDU session/bearer associated with the corresponding network slice information, and information on a priority of the corresponding network slice. Here, the network slice information configured for the UE means information on network slices configured for the UE by a network or information on network slices allowed by the network based on subscription information.

The UE may receive, from the base station, the handover command at step S430. The handover command is generated by the target base station based on the specific network slice information received from the core network entity. As described above, the core network entity may identify information on the specific network slice based on the network slice request information and the subscription information.

For example, in the case of the handover of the UE, the core network entity may transmit the identified specific network slice information to the target base station. When the target base station receives the specific network slice information, the target base station may generate a handover command for the UE based on at least one of the specific network slice information and network slice information allowed by the target base station. The target base station may transfer the generated handover command to the base station, and the base station may transmit the handover command to the UE.

Through these processes, the UE may perform the handover while maintaining the continuity of a service through the network slice.

As described above, it is possible for the UE, the base station and the core network entity to establish a service through a network slice, maintain the continuity of a network slice service and provide the mobility of the UE.

Hereinafter, embodiments for maintaining the mobility of an RRC connected UE are discussed in detail. Each embodiment described below may be performed independently or in combination with one or more other embodiments. Further, each embodiment may include different one or more embodiments from descriptions or embodiments described referring to FIGS. 2 to 4. In addition, the base station and the UE discussed in descriptions and embodiments described with reference to FIGS. 2 to 4 may be performed in each of embodiments described below as well.

A First Embodiment: Transferring UE Indication Information Including Network Slice Information In the case of a UE in an RRC connected state, it may be effective from a network perspective that a handover is to be performed to a cell supporting a network slice (or a cell supporting/allowing a specific network slice configured for the corresponding UE).

In addition, in the case of a UE in an RRC idle state or a UE in an RRC inactive state, for RRC connection establishment of the UE, recognizing by a base station that a specific network slice is configured for the UE may be helpful for the UE to select a cell/network for consecutively providing a service based on the corresponding network slice as the UE moves.

For example, i) when a serving cell (or a current cell or a Pcell, hereinafter, referred to as "serving cell") provides network slice information through system information, and a UE receives the network slice information through the system information in the serving cell, ii) when a specific network slice is configured for the UE in advance, or iii) when a specific network slice is configured for the UE through a network, the UE may indicate request information (network slice request information) on this to a base station.

The network slice request information represents single slice information configured for the UE or a collection of single slice information configured for the UE. This represents information on a network slice allowed by a network based on the slice information configured for the UE by the network or subscription information. Hereinafter, the request information on the network slice may be used the meaning as this. For another example, a UE configured with a network slice, a UE configured with data transmission and reception through a specific network slice, a UE available to network slicing, or a UE for performing data communication based on a specific network slice through network slicing, in the RRC idle state may initiate a procedure of indicating configured slice request information to a base station in the case of at least one of when RRC connection establishment is performed, when entering or leaving a cell/network supporting/allowing a current network slice, when initiating or terminating a PDU session, when network slicing related system information is changed, when a configured network slice for receiving through network slicing is changed, when a configured network slice service for receiving through network slicing is changed. For example, a UE has received network slice information configured when a PDU session is established through a previous network attachment procedure. Upon the receipt, the UE may initiate a procedure of indicating corresponding network slice request information to a base station when a RRC connection is established.

For further another example, when a UE is configured with a network slice, when a UE is configured with data transmission and reception through a specific network slice, when a UE is able to support network slicing, or when a UE performs data communication based on a specific network slice through network slicing, in the RRC inactive state, the UE may initiate a procedure of indicating network slice request information to a base station. That is, the UE may initiation the procedure in the case of at least one of i) when RRC connection establishment is performed, ii) when entering or leaving a cell/network supporting/allowing a current network slice, iii) when initiating or terminating a PDU session, when network slicing related system information is changed, iv) when a configured network slice for receiving through network slicing is changed, v) when a configured network slice service for receiving through network slicing is changed. Here, the RRC inactive state represents a new state based on a core network connection in the NR. The new state may satisfy the following characteristics.

While the UE is in the new state, the attributes of UE, RAN and CN are characterized as follows:

The connection between CN and RAN is maintained in terms of both control and user planes.

The UE is reachable by a RAN initiated notification procedure for which the relevant parameters are configured by RAN itself.

RAN is tracking the UE location on the level of a "RAN-based notification area" and is aware whenever the UE moves from one "RAN-based notification area" to another.

As yet another example, a UE configured with a network slice, a UE configured with data transmission and reception through a specific network slice, a UE available to network slicing, or a UE for performing data communication based on a specific network slice through network slicing, in the RRC connected state may initiate a procedure of indicating network slice request information to a base station in the case of at least one of i) when RRC connection establishment is performed, ii) when entering or leaving a cell/network supporting/allowing a current network slice, iii) when initiating or terminating a PDU session, when network slicing related system information is changed, iv) when a configured network slice for receiving through network slicing is changed, v) when a configured network slice service for receiving through network slicing is changed, or vi) when an RRC connection reconfiguration confirmation message is transmitted to a target base station after having received an RRC connection reconfiguration message including mobility control information.

The network slicing may be operated independently between cells/base stations using an identical frequency. A network slicing area may be configured regardless of a frequency.

The UE may include one or more slice information configured for the UE in the network slice request information. Alternatively, the UE may include, in the network slice request information, at least one of corresponding network slice information received through system information, configured for the UE in advance, or received through an RRC connection reconfiguration message, information for identifying a service/PDU session/bearer associated with the corresponding network slice information, and priority information on a corresponding network slice.

The network slice request information may be transmitted through a new field included in an RRC message of at least one of a UE assistance message, an RRC connection establishment request message, an RRC connection setup complete message, or transmitted through a new RRC message newly defined. Alternatively, the network slice request information may be transmitted to a base station through an RRC connection setup complete message by being included a NAS message.

The base station may control data transmission and reception through network slicing based on the network slice request information received from UEs. For example, the base station may initiate or terminate this. As another example, the base station may indicate network slice information to a UE. As further another example, the base station may indicate a bearer associated with network slicing to a UE.

A Second Embodiment: Transferring Network Slice Request Information to a Base Station Through a Core Network Entity In the case of a UE in the RRC connected state, it may be effective from a network perspective to handover the UE in the RRC connected state to a cell supporting a network slice (or a cell supporting/allowing a specific network slice configured for the corresponding UE).

In addition, in the case of a UE in an RRC idle state or a UE in an RRC inactive state, a base station needs to be aware of that a specific network slice is configured for the UE in order to enable the UE to receive consecutively a service based on the corresponding network slice as the UE moves.

For example, i) when a serving cell (or a current cell or a Pcell, hereinafter, referred to as "serving cell") provides network slice information through system information, and a UE receives the network slice information through the system information in the serving cell, ii) when a specific network slice is configured for the UE in advance, and/or iii) when a specific network slice is configured for the UE through a network, the UE may indicate network slice request information on this to a base station through a core network entity (e.g., an access and mobility management function (AMF) which is a 5G core network entity).

As another example, a UE configured with a network slice, a UE configured with data transmission and reception through a specific network slice, a UE available to network slicing, or a UE that for performing data communication based on a specific network slice through network slicing, in the RRC idle state may transmit network slice request information to a core network entity in the case of at least one of i) when RRC connection establishment is performed, ii) when entering or leaving a cell/network supporting/allowing a current network slice, iii) when initiating or terminating a PDU session, iv) when network slicing related system information is changed, v) when a configured network slice for receiving through network slicing is changed, vi) when a configured network slice service for receiving through network slicing is changed, vii) when a network attachment is performed, viii) when a tracking area is updated, ix) when a service request is performed, x) when network connection registration is performed, or xi) when PDU session establishment is performed.

As further another example, a UE configured with a network slice, a UE configured with data transmission and reception through a specific network slice, a UE available to network slicing, or a UE that for performing data communication based on a specific network slice through network slicing, in the RRC inactive state may transmit network slice request information to a core network entity in the case of at least one of i) when RRC connection establishment is performed, when entering or leaving a cell/network supporting/allowing a current network slice, when initiating or terminating a PDU session, when network slicing related system information is changed, when a configured network slice for receiving through network slicing is changed, when a configured network slice service for receiving through network slicing is changed, when a network attachment is performed, when a tracking area is updated, when a service request is performed, when network connection registration is performed, or when PDU session establishment is performed.

As yet another example, a UE configured with a network slice, a UE configured with data transmission and reception through a specific network slice, a UE available to network slicing, or a UE that for performing data communication based on a specific network slice through network slicing, in the RRC connected state may transmit network slice request information to a core network entity in the case of at least one of i) when RRC connection establishment is performed, ii) when entering or leaving a cell/network supporting/allowing a current network slice, iii) when initiating or terminating a PDU session, iv) when network slicing related system information is changed, v) when a configured network slice for receiving through network slicing is changed, vi) when a configured network slice service for receiving through network slicing is changed, vii) when a network attachment is performed, viii) when a tracking area is updated, ix) when a service request is performed, x) when network connection registration is performed, or xi) when PDU session establishment is performed.

The core network entity (e.g., an AMF which is a 5G core network entity) may transmit specific network slice information to a base station through a procedure for setting up a UE context.

The network slicing may be operated independently between cells/base stations using an identical frequency. A network slicing area may be configured regardless of a frequency. For example, a specific network slice may be configured in at least one cell/base station/area of a network and not provided in another cell/base station/area. When a UE performs at least one of network attachment, a tracking area update, a service request, network connection registration or PDU session establishment, the corresponding network slice area may be one of an attachment area, a tracking area, or a set of cells, allocated by a core network entity (e.g., an AMF which is a 5G core network entity). Alternatively, when a UE performs at least one of network attachment, a tracking area update, a service request, network connection registration or PDU session establishment, the corresponding network slice area may be one of an RAN notification area, or a set of cells, allocated by a base station.

The UE may include information on a specific slice configured for the UE in the network slice request information transmitted to the core network entity. Alternatively, the UE may include, in the network slice request information, at least one of corresponding network slice information received through system information, configured for the UE in advance, or received through an RRC connection reconfiguration message, information for identifying a network slice service/PDU session/bearer associated with the corresponding network slice information, and priority information on a corresponding network slice. The slice information configured in advance which is included in the network slice request information represents slice information allowed by the network based on slice information configured for the UE by a network or subscription information.

The base station may control data transmission and reception through network slicing based on the network slice request information received from the UE through the core network entity. The core network entity may verify whether the UE has a right to access the corresponding network slice. Accordingly, the base station may control data transmission and reception through network slicing based on the network slice request information received from the core network entity. For example, the base station may initiate or terminate this. As another example, the base station may indicate network slice information to the UE. As further another example, the base station may indicate a bearer of a PDE session associated with the network slice to the UE. As yet another example, the base station may process data based on the network slice. As yet another example, the base station may process may perform distinguished data processing for the corresponding network slice by selecting a RAN portion of the corresponding network slice.

A Third Embodiment: Transferring Slice Information to a Target Base Station During a Handover While a UE in the RRC connected state transmits and receive data through a specific network slice, a handover may be performed as the UE moves. As described above, recognizing that a neighboring cell supports the corresponding slice may be helpful for a 5G cell/base station/network to allow the UE to be handed over.

As described in the first and second embodiments, a base station recognizes network slice information configured for the UE in the RRC connected state or allowed in a network, by help information (e.g., network slice request information) provided by the UE or a 5G core network entity.

While preparing the handover, the source base station may transfer the network slice request information received from the UE to a target base station, if available. As another example, while preparing the handover, the source base station may transfer the network slice request information received from the core network entity to a target base station, if available. As further another example, while preparing the handover, the source base station may transfer the network slice request information received from the UE or the core network entity to a target base station through the core network entity, if available. Here, transferred network slice request information may mean specific network slice information that the core network entity has identified based on subscription information.

As another example, before updating network slice information after the handover has been performed, the UE may read network slice related system information (or on-demand system information associated with network slice related minimum system information or control information for identifying whether network slicing is supported/allowed/configured/performed).

As further another example, when network slice related minimum system information or control information for identifying whether network slicing is supported/allowed/configured/performed is not provided from a source cell, or when a UE that has not performed reception through network slicing performs a handover, the UE after the handover has been performed may indicate the configured network slice information to the base station.

For example, the network slice request information may be transmitted with being included in a handover request message. As another example, the configured network slice information may be transmitted by being included in a handover preparation message. As further another example, the configured network slice information may be transmitted by being included in AS-context information of the handover preparation message. As yet another example, a target cell/base station may include the network slice information in a handover response inter-base station interface (Xn) message or a handover command inter-node RRC message. For example, network slice information that is supported/allowed by a target cell/base station may be included in the handover response inter-base station interface (Xn) message or the handover command inter-node RRC message.

As another example, when a target cell/base station does not support/allow a corresponding network slice, the target base station may include information for indicating this in a handover response inter-base station interface (Xn) message or a handover command Inter-node RRC message. For example, failed network slice information that is not supported/allowed by the target cell/base station may be included in the handover response inter-base station interface (Xn) message or the handover command inter-node RRC message.

For example, when a target cell/base station has received the configured network slice information through a source cell/base station, and when the target cell/base station does not support/allow network slicing or does not provide the corresponding configured network slice through the network slicing, or the source cell and the target cell are included in different network slice areas from each other, the target base station may transfer, to the source base station, the handover response inter-base station interface (Xn) message including information for indicating not supporting/allowing the network slice received through the source base station. As another example, when the target cell/base station has received the information through the source cell/base station, and when the target cell/base station does not support/allow network slicing or does not provide the corresponding configured network slice through the network slicing, the target base station may transfer a handover command inter-node RRC message including information for indicating this to a corresponding UE. As another example, the source base station may not determine the handover to the target base station.

As further another example, while preparing the handover, the source base station may transfer network slice information received from the UE or the core network entity to a target base station through the core network entity, if available. In the typical technology, a handover based on an interface between a core network entity and a base station is used only when a handover based on an inter-base station interface cannot be used. For example, in the typical LTE technology, a handover based on an interface (S1) between a core network entity and a base station is used only when a handover based on an inter-base station interface (X2) cannot be used. Similarly, in the 5G network, a handover based on an interface between a core network entity and a base station may be used only when a handover based on an inter-base station interface cannot be used. For example, the handover based on an interface between a core network entity and a base station may be used when a direct interface is not present between the source base station and the target base station, or the source base station and the target base station are included in different network areas from each other. Thus, when a direct interface is not present between the source base station and the target base station, or the source base station and the target base station are included in different network areas from each other, the source base station may transfer network slice information received from a UE or a core network entity to the target base station through the core network entity.

A Fourth Embodiment: Transferring Network Slice Information to a Target Base Station Through an RRC Connection Reconfiguration Confirmation Message For example, a UE may receive an RRC connection reconfiguration message including mobility control information through a source base station. As another example, a UE may receive an RRC connection reconfiguration message including mobility control information generated from a target base station through a source base station. The UE may include the network slice information (network slice related information or configured network slice information) in an RRC connection reconfiguration confirmation message. The network slice related information may include at least of information for identifying a service/PDU session/bearer associated with corresponding network slice information and bearer information of a PDU session associated with the network slice. Upon receipt of the network slice related information, the UE may initiate a procedure of identifying the network slice information to a core network entity. To this end, the UE may transmit a NAS message including the network slice information to the base station.

The base station may control data transmission and reception through network slicing based on the information received from UEs. For example, the base station may initiate or terminate this. As another example, the base station may indicate the network slice information to the UE. As further another example, the base station may indicate a bearer associated with network slicing to the UE. As yet another example, the base station may process data based on the network slice.

A Fifth Embodiment: Receiving Slice Information Through an Interface Between a Core Network and a Base Station from a Core Network Entity in the Process of a Handover A base station may receive slice information through an interface between the core network and the base station from the core network entity in the process of an inter-base station handover of a UE in the RRC connected state. For example, when the core network entity receives a path change request message (e.g., a path switch request message) including specific network slice information from a target base station, the core network entity may transmit a path change request confirmation message including the specific network slice information. The base station may control data transmission and reception through a corresponding network slice based on the information received from the core network entity. For example, the base station may initiate or terminate this. As another example, the base station may indicate the network slice information to the UE. As further another example, the base station may indicate a service/PDU session/bearer associated with the network slice to the UE. As yet another example, the base station may process data based on the network slice.

As another example, the core network entity may transmit specific network slice information to the base station for setting up/configuring a UE context for a network slice in a handover process of the RRC connected UE. A UE configured with a network slice, a UE configured with data transmission and reception through a specific network slice, a UE available to network slicing, or a UE that for performing data communication based on a specific network slice through network slicing may transmit network slice request information to the core network entity in the case of at least one of i) when RRC connection establishment is performed, ii) when entering or leaving a cell/network supporting/allowing a current network slice, iii) when initiating or terminating a PDU session, iv) when network slicing related system information is changed, v) when a configured network slice for receiving through network slicing is changed, vi) when a configured network slice service for receiving through network slicing is changed, vii) when a network attachment is performed, viii) when a tracking area is updated, ix) when a service request is performed, x) when network connection registration is performed, or xi) when PDU session establishment is performed. As another example, a base station that has received network slice information from a UE or a core network entity, a base station that has indicated network slice information to a UE, a base station that has indicated a service/PDU session/bearer associated with a network slice to a UE, or a base station that processes data based on a corresponding network slice may transmit network slice request information to the core network entity in the case of at least one of i) when entering or leaving a cell/network supporting/allowing a current network slice, ii) when initiating or terminating a PDU session, iii) when network slicing related system information is changed, iv) when a configured network slice for receiving through network slicing is changed, v) when a configured network slice service for receiving through network slicing is changed, vi) when a network attachment is performed, vii) when a tracking area is updated, viii) when a service request is performed, ix) when network connection registration is performed, or x) when PDU session establishment is performed. The network slice request information may include network slice related information or configured network slice information. The network slice related information may be at least one of information for identifying a service/PDU session/bearer associated with corresponding network slice information and bearer information of a PDU session associated with the network slice.

The core network entity may transmit specific network slice information to the base station for setting up a UE context for a corresponding network slice. To this end, the core network entity may indicate, to the base station, UE context information including specific configured network slice information according to a value that is included in subscriber information etc. though a subscriber information server etc. The UE context information transmitted by the core network entity may include network slice related information or configured network slice information. The network slice related information may be at least one of information for identifying a service/PDU session/bearer associated with the corresponding network slice information and bearer information of a PDU session associated with the network slice.

For other example, while preparing the handover, the source base station may transfer specific network slice information received from the UE or the core network entity to a target base station through the core network entity, if available. The core network entity that has received the specific network slice information received from the source base station may transmit the specific network slice information to the target base station for setting up a UE context for a corresponding network slice.

A Sixth Embodiment: A Method of a UE for Transmitting Network Slice Information to a Base Station after a Handover has been Completed For example, in a handover process of a UE in an RRC connected state, a source base station may transfer network slice information received from the UE or a core network entity to a target base station through the core network entity, if available. When the UE receives a handover command generated from the target base station through the source base station, the UE performs the handover. The handover command may include the network slice information (network slice related information or configured network slice information). The network slice related information may include at least one of information for identifying a service/PDU session/bearer associated with the corresponding network slice information and bearer information of a PDU session associated with the network slice. Upon the receipt of the network slice related information, the UE may initiate a procedure for identifying the network slice information to the core network entity. The procedure of identifying the network slice information to the core network entity may be at least one of a network attachment, a tracking area update, a service request, network connection registration or PDU session establishment.

Through operations described above, a UE may be able to consecutively use a service through a network slice even when the UE moves.

Hereinafter, a base station and a UE for performing a part or all of each embodiment described above will be discussed with reference to the drawings.

Figure 5:
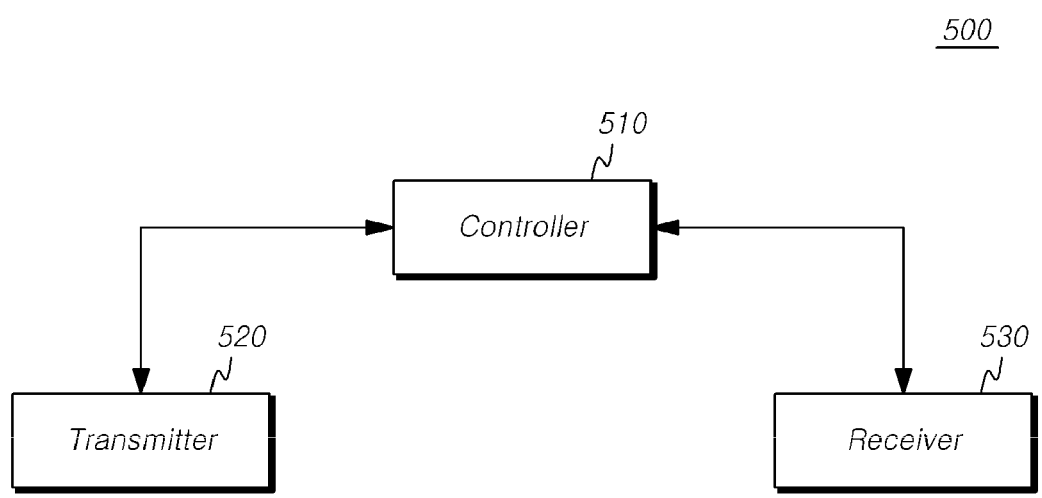
FIG. 5 is a block diagram illustrating a base station according to at least one embodiment of the present disclosure.

FIG. 5 is a block diagram illustrating a base station according to at least one embodiment of the present disclosure.

Referring to FIG. 5, the base station 500 may include a receiver 530 receiving network slice request information from a UE configured with a network slice and a controller 510 controlling the network slice request information to be transferred to a core network entity.

In addition, the receiver 530 may receive specific network slice request information configured based on the network slice request information from the core network entity. The receiver 530 may receive the network slice request information through an radio resource control (RRC) connection setup message.

The network slice request information may include the specific network slice information configured for the UE. Furthermore, the network slice request information may include at least one of network slice information configured for the UE, information for identifying a network slice service/PDU session/bearer associated with the corresponding network slice information, and priority information on the corresponding network slice. Here, the network slice information configured for the UE may mean slice information configured for the UE by a network or slice information allowed by the network based on subscription information.

The base station 500 may further include a transmitter 520 transmitting the network slice request information to the core network entity. The transmitter 520 may transmit the specific network slice information to a target base station. The specific network slice information transmitted to the target base station may be transmitted through the core network entity.

Meanwhile, the controller 510 may control the overall operations of the base station 500 for receiving the network slice information from the UE and the core network entity, controlling the network slice information, and controlling the mobility of the UE.

In addition, the transmitter 520 and the receiver 530 are used to transmit or receive signals, messages, data required to perform embodiments described above to or from the UE, the target base station and the core network entity.

Figure 6:
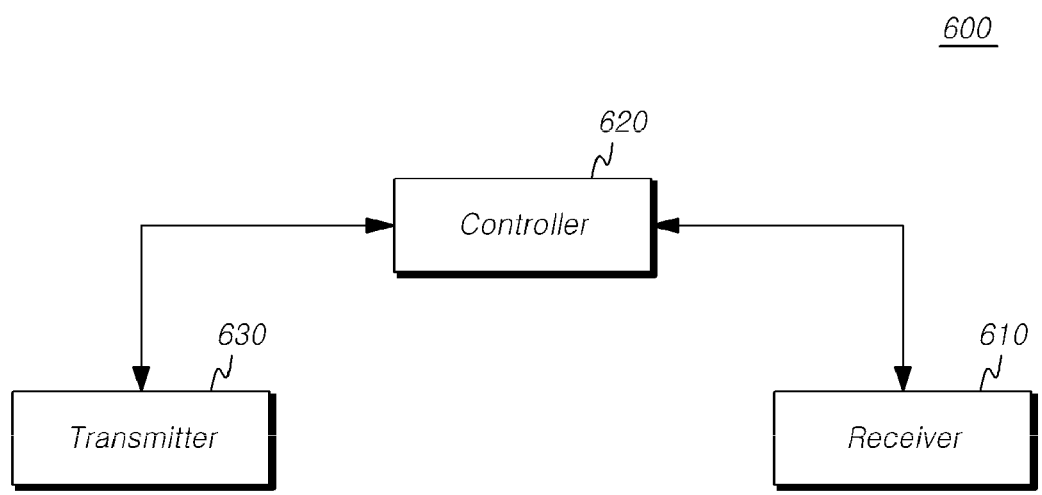
FIG. 6 is a block diagram illustrating a user equipment according to at least one embodiment of the present disclosure.

FIG. 6 is a block diagram illustrating a UE according to at least one embodiment of the present disclosure.

Referring to FIG. 6, the UE 600 may include a controller 620 configuring (e.g., creating or generating) network slice information, a transmitter 630 transmitting network slice request information to a base station, and a receiver 610 receiving, from the base station, a handover command generated based on specific network slice information received by a target base station from a core network entity.

The controller 620 may configure one or more network slices and configure one network slice to be associated with one protocol data unit (PDU).

The transmitter 630 may transmit network slice request information through an radio resource control (RRC) connection setup message or a non-access stratum (NAS) message included in the RRC connection setup message.

Meanwhile, the controller 620 may configure a network slice through the base station or the core network entity and control the overall operations of the UE 600 for maintaining the continuity of a service through the network slice even when the UE moves.

In addition, the transmitter 630 and the receiver 610 are used to transmit or receive signals, messages, data required to perform embodiments described above to or from the base station, the target base station and the core network entity.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

What is claimed is:

1. A method of a base station for transmitting and receiving data through a network slice, the method comprising:
   receiving, from a user equipment (UE), a non-access stratum (NAS) message including network slice request information, the network slice request information being used for requesting the network slice;
   transmitting, to a core network entity, the network slice request information;
   receiving, from the core network entity, network slice information in response to the network slice request information;
   transmitting, to a target base station, a handover request message including the network slice information; and
   receiving, from the target base station, a handover request confirmation message in response to the handover request message including the network slice information;
   wherein one or more protocol data unit (PDU) sessions associated with one or more network slices included in the network slice information are not supported by the target base station, and the handover request confirmation message includes information for indicating a rejection of the one or more protocol data unit (PDU) sessions by the target base station.

2. The method according to claim 1, wherein the NAS message including the network slice request information is included in a radio resource control (RRC) connection setup completion message.

3. The method according to claim 1, wherein the transmission of the handover request message is performed through a direct interface associated with the target base station.

4. The method according to claim 1, wherein the handover request confirmation message includes PDU session identification information for indicating the PDU session associated with the network slice not supported by the target base station.

5. A method of a user equipment (UE) for transmitting and receiving data through a network slice, the method comprising:
   transmitting, to a base station, a non-access stratum (NAS) message including network slice request information; and
   receiving, from the base station, a handover command based on at least one of network slice information allowed by a target base station,
   wherein the base station transmits, to a core network entity, the network slice request information and receives, from the core network entity, network slice information in response to the network slice request information,
   wherein the base station transmits, to the target base station, a handover request message including the network slice information and receives, from the target base station, a handover request confirmation message in response to the handover request message including the network slice information, and
   wherein one or more protocol data unit (PDU) sessions associated with one or more network slices included in the network slice information are not supported by the target base station, and the handover request confirmation message includes information for indicating a rejection of the one or more protocol data unit (PDU) sessions by the target base station.

6. The method according to claim 5, wherein the NAS message including the network slice request information is included in a radio resource control (RRC) connection setup completion message.

7. The method according to claim 5, wherein the transmission of the handover request message is performed through a direct interface associated with the target base station.

8. The method according to claim 5, wherein the handover request confirmation message includes PDU session identification information for indicating the PDU session associated with the network slice not supported by the target base station.

9. A base station for transmitting and receiving data through a network slice, the base station comprising:
   a transmitter;
   a receiver; and
   a controller which controls the transmitter and receiver in order to perform:
   receiving, from a user equipment (UE), a non-access stratum (NAS) message including network slice request information, the network slice request information being used for requesting the network slice;
   transmitting, to a core network entity, the network slice request information;
   receiving, from the core network entity, network slice information configured by the network slice request information;
   transmitting, to a target base station, a handover request message including the network slice information; and
   receiving, from the target base station, a handover request confirmation message in response to the handover request message including the network slice information,
   wherein one or more protocol data unit (PDU) sessions associated with one or more network slices included in the network slice information are not supported by the target base station, and the handover request confirmation message includes information for indicating a rejection of the one or more protocol data unit (PDU) sessions by the target base station.

10. The base station according to claim 9, wherein the NAS message including the network slice request information is included in a radio resource control (RRC) connection setup completion message.

11. The base station according to claim 9, wherein the transmission of the handover request message is performed through a direct interface associated with the target base station.

12. The base station according to claim 9, wherein the handover request confirmation message includes PDU session identification information for indicating the PDU session associated with the network slice not supported by the target base station.

13. A user equipment for transmitting and receiving data through a network slice, the user equipment comprising:
a transmitter;
a receiver; and
a controller which controls the transmitter and receiver in order to perform:
transmitting, to a base station, a non-access stratum (NAS) message including network slice request information;
receiving, from the base station, a handover command based on at least one of network slice information allowed by a target base station,
wherein the base station transmits, to a core network entity, the network slice request information and receives, from the core network entity, network slice information configured by the network slice request information,
wherein the base station transmits, to the target base station, a handover request message including the network slice information and receives, from the target base station, a handover request confirmation message in response to the handover request message including the network slice information; and
wherein one or more protocol data unit (PDU) sessions associated with one or more network slices included in the network slice information are not supported by the target base station, and the handover request confirmation message includes information for indicating a rejection of the one or more protocol data unit (PDU) sessions by the target base station.

14. The user equipment according to claim 13, wherein the NAS message including the network slice request information is included in a radio resource control (RRC) connection setup completion message.

15. The user equipment according to claim 13 wherein the transmission of the handover request message is performed through a direct interface associated with the target base station.

16. The user equipment according to claim 13, wherein the handover request confirmation message includes PDU session identification information for indicating the PDU session associated with the network slice not supported by the target base station.

* * * * *